Dec. 30, 1969   H. STEINBERGER ET AL   3,486,284
COLD STORAGE PLANT
Filed March 29, 1965   3 Sheets-Sheet 1
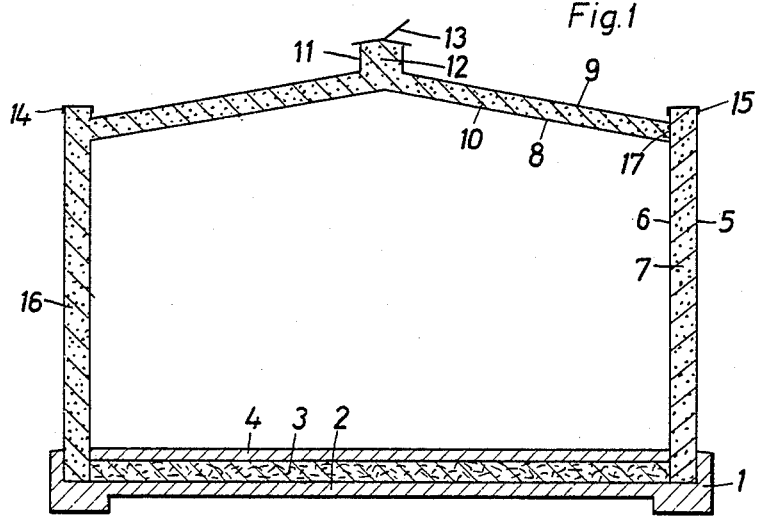
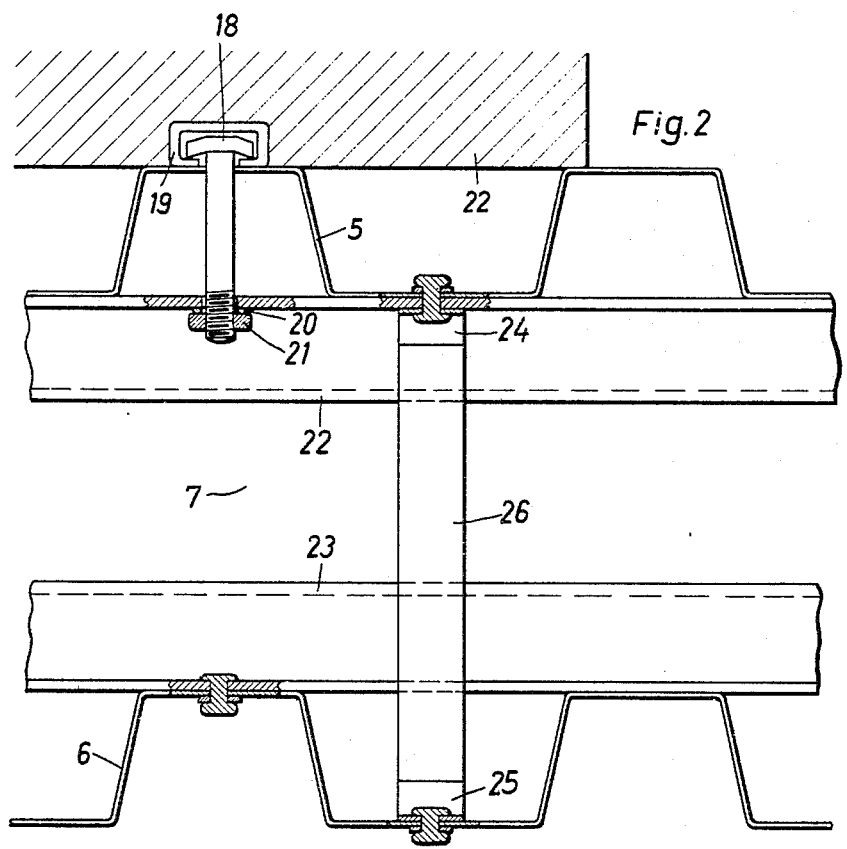
Inventors
Hans Steinberger
Irmhild Sauerbrunn
By Dicke & Craig
ATTORNEYS Dec. 30, 1969  H. STEINBERGER ET AL  3,486,284

COLD STORAGE PLANT

Filed March 29, 1965  3 Sheets-Sheet 2

Inventors
Hans Steinberger
Irmhild Sauerbrunn
By Dicke + Craig
ATTORNEYS

3,486,284
COLD STORAGE PLANT
Hans Steinberger, 112 Dachauer Strasse, Munich, Germany, and Irmhild Sauerbrunn, 4 Neue Anlage, Altenbach, Odenwald, Germany
Filed Mar. 29, 1965, Ser. No. 446,471
Claims priority, application Austria, Mar. 27, 1964, A 2,738/64; Germany, Apr. 30, 1964, R 37,807
Int. Cl. E04b *1/76, 2/30;* E04h *5/10*
U.S. Cl. 52—262                                                               1 Claim

ABSTRACT OF THE DISCLOSURE

The present disclosure relates to a cold storage building, advantageously a one-floor structure, comprising walls and ceiling having an inner and outer shell structure defining a cavity therebetween, said shell structures comprising composite profiled sheeting and spacer means connecting said inner and outer shell structures in a grid-like manner, said spacer means composed of materials having low heat conductivity.

---

The present invention relates to cold storage plants. More particularly, the invention relates to one-floor cold storage buildings constructed so as to be close to the ground.

Recently, the tendency has been to depart from cold storage plants which are several stories high and to erect instead one-floor cold storage buildings or cold stores, i.e., plants which are close to or even with the ground.

Independently, however, of the construction as a one-floor or several stories-high building, experience has shown that the heretofore known cold storage buildings present fire hazards to a relatively great extent. Numerous and heavy damages have been caused by fires in cold storage plants. Such fires may be caused particularly easily during the construction thereof and in the course of repairs, for example, during welding operations on the cooling plant, by short circuits, or by local overheating.

One of the objects of the present invention is to provide a cold storage plant constructed so as to overcome the disadvantages and deficiencies of prior art cold storage plants.

Another object of the present invention is to provide a cold storage plant or building which may be constructed in a structurally simple and easy manner.

A further object of the invention is to provide a cold storage plant or building which contains insulation at least equal, but in most cases far superior, to the insulations used in prior art cold storage plants.

A still further object of the invention is to provide a cold storage plant or building which has a considerably reduced danger of occurrence of fires and thus has a much increased fire resistance as compared to prior art cold storage plants.

These and other objects of the present invention will become apparent to those skilled in the art from a reading of the following specification and claims.

In accordance with the present invention, the objects enumerated above are achieved wherein, in a cold storage building which is constructed particularly as a one-floor plant being even with or close to the ground, the walls and the ceiling are provided with two shells and comprise an outer shell of profiled sheet metal plates as well as an inner shell of a non-combustible material and wherein the interspaces therebetween are provided with insulating material.

Moreover, a type of construction wherein the inner shell also consists of sheet metal has been found to be advantageous.

The provision may be made that the spaces between the walls are each sealed off individually. The same provision may also be made for the ceiling. This provision and arrangement, however, is modified—in accordance with a further embodiment of the present invention—in such a manner that the interspaces of the walls and of the ceiling are interconnected throughout and thus constitute a single space.

The utilization of trapezoidally-shaped profiled sheets, for example, of sheet steel, aluminum or the like, for the construction of the outer shell of the walls and, if desired, of the inner shell as well as of the ceiling has been found to be advantageous. The use of profiled steel sheets, trapezoidal profiled sheets or corrugated sheet steel has the additional advantage of a high static inherent rigidity so that the inner shell may be made, if desired, from a material which, as such, need not contribute anything to the statics of the building.

Disposed in the form of a grating (if viewed over a distance) between the outer and the inner shells are connecting elements made of difficultly inflammable or non-inflammable materials having a low heat conductivity. According to a particular characteristic of the present invention, the said connecting elements are rotatably and, respectively, pivotally positioned in the two shells so as to allow for a relative movement of the two shells. An expedient provision consists of the use of ceramic materials, for example, steatite or materials pressed from minerals such as maialite (wenerite) for these connecting elements. It is also possible, however, to employ connecting elements made of difficultly flammable synthetic materials having a low heat conductivity since the connecting elements may be completely enclosed and surrounded by the insulating material. This latter insulating material is preferably a poured material.

Utilizable as insulating material for the interspaces are inorganic substances which are adapted to being poured or to flow freely as has been set forth hereinabove. Perlite has been found to be particularly suitable as such an insulating material. It is also possible, however, to use mineral materials in the form of wool-like mats or sheets or a fibrous material which has been chopped up or reduced to small pieces and treated with a binding agent so that the material is transformed into the form of a granulate.

On the other hand, it is also advantageous to use as insulating materials for the interspaces between the two shells difficultly flammable and high melting synthetic foam substances, such as, for example, phenol resin foam, polyurethane foam, formaldehyde resin foam, or the like, in the form of sheets or plates or as a granulate. The synthetic resin foam insulation materials may be foamed in the interspaces themselves according to another advantageous embodiment of the present invention.

The inner shell may be made in an advantageous manner from perforated sheet metal in the form of sheets or strips. It is also possible to use perforated mineral fiber sheets for the covering which is used as the inner shell in the cold storage plant of the present invention. Another possibility involves using perforated hard fiber sheets or plates as the inner shell.

The overlapping portions of the profiled steel sheets of the outer shell are provided, in a conventional manner, with sealing strips, and difficultly flammable plastic foils are glued thereover in the form of strips. Alternatively, a difficultly flammable plastic may be sprayed thereon.

While the outer shell must be water vapor-proof under all circumstances, it may be expedient, in order to compensate for the existing partial pressures, either to insert in the overlapping portions of the inner shell a difficultly flammable vapor-permeable fabric, for example, an asbestos cloth, or to provide the inside of the covering plates or sheets with water vapor-permeable, difficultly flammable plastic foils.

A frame construction made from metal profiles, preferably in the form of a grating of T-shaped profiles or the like, serves for mounting the sheets or the like which form the inner shell.

In case mineral wool is employed as the insulating material, it is advisable to provide a wire netting at the inside thereof, as conventionally known in the art, so that the mineral wool may be inserted between the outer shell made from profiled metal sheets and the wire netting. Here again, the formation of the inner shell is effected with corresponding covering sheets.

If insulating material which is adapted to being poured or to flow is used as the insulation in the interspace between the inner and outer shells, it may be condensed or compressed in a form-retaining manner by shaking or vibrating it from the outside. The pouring operation is carried out suitably by means of filler or inlet tubes at the ridge and at the edges of the roof, respectively. These filler or inlet tubes may be disposed either locally, or they may extend over the entire length of the cold storage building.

In accordance with a further embodiment of the present invention, in the case where the inner lining is also to be made water vapor-proof, a heavy gas, for example, a halogenated hydrocarbon such as a Freon or the like, may be put into the interspace, in addition to the insulating material. Separate connections may be provided for the filling in of the heavy gas.

After the assembly has been completed, it is suitable in many instances to produce and to maintain a partial vacuum in the filled interspaces. Means for maintaining the vacuum are connected with suitable lines or the like.

Further features and advantages of the present invention will be described in detail on the basis of the drawings, wherein FIGURE 1 is a schematic cross-sectional view through a cold storage building provided in the manner proposed by the present invention;

FIGURE 2 is a detailed cross-sectional view through a wall in accordance with one embodiment of the present invention;

Figure 3:
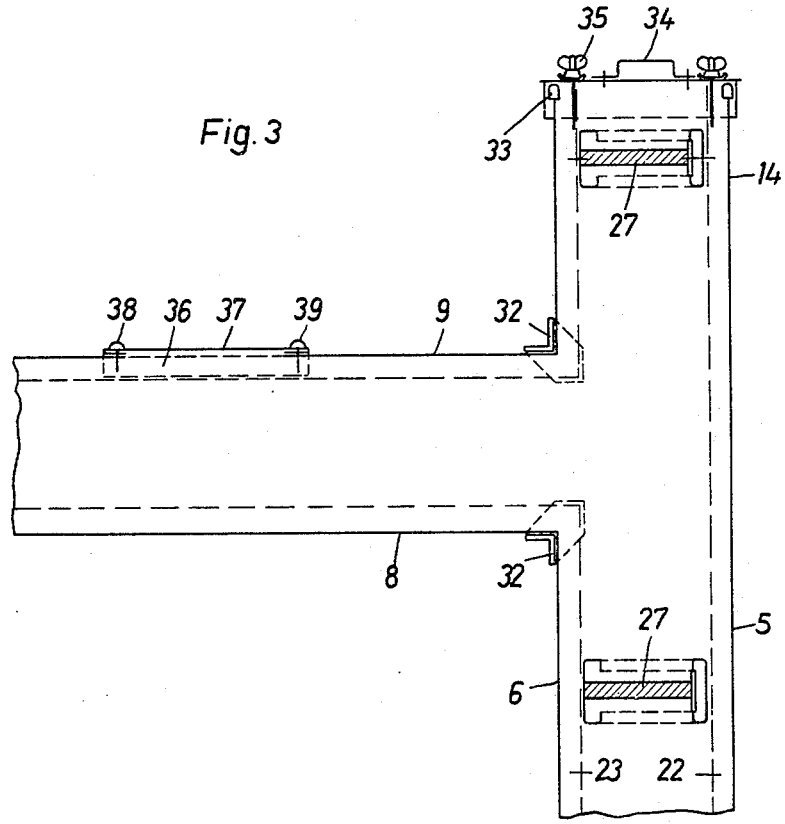
FIGURE 3 illustrates in detail the transition from the roof to a lateral wall of a cold storage plant according to the present invention.
Figure 4:
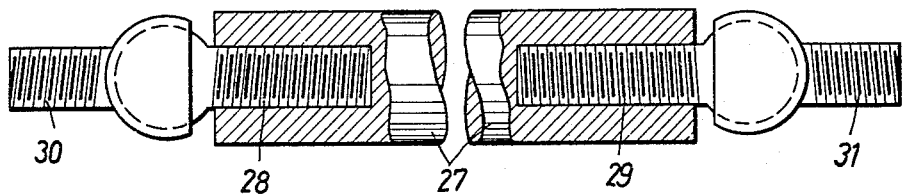
FIGURE 4 illustrates a connecting element.

The cold storage building proposed by the present invention is erected without brickwork. Steel structures or steel and concrete structures serve as the supporting construction. The latter may be provided at the inside. This type of construction results in advantages because of the fact that any temperature flucuations which might possibly have an adverse effect on the supporting elements are reduced. However, the beams and girders may also be disposed on the outside of the plant so that the shell is—in a manner of speaking—suspended at the structure thereof. The use of profiled steel sheets or plates results in a further modification as compared to the conventional methods of constructing cold storage buildings.

As shown in FIGURE 1, the two-shell construction is erected on a standard foundation 1 with a base layer of concrete 2 upon which a layer of rigid insulating material 3 is applied and above which is provided a layer of concrete slab topping 4. The supporting elements, such as, for example, the girders, beams or the like, have not been shown in FIGURE 1. The installation consists of an outer shell or lining 5 of profiled steel sheets and of an inner shell or lining 6 which consists of similar sheets as in the embodiments according to FIGURES 1 to 4. The insulating material 7 is filled in, inserted or poured between the inner and outer shells.

The ceiling consists of a bottom or lower lining 8 and an upper lining 9 preferably made of profiled steel sheets. A non-combustible or difficultly flammable insulating material 10 is again inserted, filled in or poured into the interspace therein. For filling and, if desired, refilling, in order to compensate for the settling which takes place after the erection of the plant in the course of a longer or shorter period of time, a filler tube 11 is disposed at the ridge thereof. The filler tube may be positioned either at individual places on the ridge, or it may be provided as a continuous filling trough. Disposed in this filler tube 11 is a reserve amount 12 of insulating material. The inlet opening of the filler tube 11 is closed by means of a filler cover 13, illustrated schematically in FIGURE 1. In the place of a filler tube or a filler trough 11 disposed at the ridge of the roof, filler tubes or inlets 14 and 15 may be arranged above the lateral walls either exclusively or additionally. If a level or horizontal construction (not shown) is chosen for the ceiling, it is advisable to initially mount or assemble the lower lining 8 with an auxiliary construction, to then apply thereon the insulating material 10 and only then to thereafter provide the upper shell or lining 9.

The interspaces 7, 10 and 16 may be provided in each case as closed individual interspaces, as has been indicated in the right-hand part of FIGURE 1 by the separating wall 17. However, they may also be interconnected with each other, as is shown in the left-hand portion of FIGURE 1 in the transition between interspace 16 and interspace 10, to form a continuous, uniform space. Preferably, insulating materials which are adapted to being poured or to flow, such as perlite, vermiculite, kieselguhr (diatomaceous earth), aerosil, silica gel, or the like, are filled into the interspaces 7, 10 and 16. Also, a chopped-up fibrous material of mineral fibers or mineral wool which is provided with a binding agent, if desired, may be employed as the insulating material. These mineral fibers may also be employed in the form of sheets or mats. However, other mineral materials, pressed or bonded, may also be used in the form of sheets, as well as, if desired, insulating sheets of high melting substances such as urea-formaldehyde resins or the like. If the supporting structure is disposed at the inside of the cold storage plant, the ceiling is laid on; if the supporting structure is provided at the outside, for example, an external tie beam and gantry construction, the ceiling is correspondingly suspended.

The walls 5, 6 of the lateral shells and 8, 9 of the ceiling, are formed or constituted of conventional profiled steel sheets, in accordance with the embodiments of FIGURES 1 to 4. In a preferred embodiment, trapezoidal profiles are used.

FIGURE 2 illustrates a partial cross-section through a lateral wall. The outer shell is formed by trapezoidal sheets 5 and the inner shell by trapezoidal sheets 6 in a like manner. The outer and inner shells are disposed preferably in such a way that the bent out portions of the profiled sheets extend in the same direction. A staggered arrangement, however, is also possible.

If the supporting structures are positioned at the outside of the cold storage plant, as has been presupposed in FIGURE 2, the outer shell 5 may also be secured to a steel concrete support 22 with the aid of hammer or hook bolts 18, iron collar bolts 19, and spring washer 20 and nut 21. U-shaped profiles 22' and 23 are horizontally disposed at the inside of the interspace 7. These profiles may also have a C-shaped or Z-shaped configuration. Spacer members 26 are provided on Z-shaped irons 24 and 25 in the manner of a grating as viewed over the entire surface. In the embodiment shown, these spacer members consist of difficultly inflammable plastic elements.

Preferably, these connecting elements may consist of a ceramic material, for example, steatite (talc), which either has the form of a block or square or of a rod. In accordance with FIGURE 4, a spacer member 27 of this type is provided with embedded ball end screws 28 and 29. These ball end screws are positioned in the ball cups or sockets of fastening screws 30 and 31 which are each attached individually either directly to the sheet metal linings 5 and 6 (FIGURE 2) or to the inner profiles 22 and 23 (FIGURE 2). This type of support or positioning allows for a relative movement of the inner lining or shell with respect to the outer lining or shell. This relative movement is, however, generally extremely small. It is essential that the connecting elements consist of materials having a poor heat conductivity so that no hot or cold bridges can be formed thereby.

FIGURE 3 illustrates the transition from the lateral walls to the ceiling of the structure. The transitions are made by means of double-walled angle pieces 32 or with the aid of sheet metal transition pieces (not shown). In the embodiment according to FIGURE 3, a spacer member 27 is also provided in the filler tube 14. The upper or top sealing of filler tube 14 is effected in a manner known per se by means of sealing elements 33, a cover or lid 34, and fastening nuts 35, or by means of similar structural elements. In FIGURE 3, a refill opening 36 is additionally provided in the horizontally disposed ceiling. This refill opening is equally closable by means of a lid 37 which is rigidly connected with the outer lining or shell 9 by means of pusher screws 38 and 39.

The static stress of the profiled sheets is due primarily to the pressure of the filler material. However, they need not be self-supporting.

The filler or inlet tubes 15 and 11, whether arranged continuously or spaced from each other, should generally be confined under the outer roof. For this purpose, lateral connecting pieces, or possibly also oblique supply lines, are advantageously used. Such connecting pieces should not extend or project through the shell or cover of the roof.

It has been found that it is especially advantageous to compress the filled-in insulating material by shaker mechanisms or the like. Compression with internal shaker mechanisms, however, involves certain difficulties. Therefore, it is more favorable to carry out and achieve the desired compression by shaking from the outside with the aid of suitable vibrators. The vibrators are generally displaced horizontally during the filling process. The compression is carried out to such an extent that the shape of the filled-in insulating material remains unchanged even if a portion of the inner shell or lining, for example, is removed.

In the normal case, compensation for the water vapor partial pressure by means of the inner shell is possible. This is attained in a suitable manner by inserting strips of asbestos cloth into the expansion joints. Because of the fact that the insulation is maintained in a dry condition, this procedure results in a fairly significant improvement in the heat insulation.

As stated hereinabove, another improvement may be obtained by also utilizing a heavy gas, for example, a hologenated hydrocarbon, in addition to the insulating material. The use of such a heavy gas results in the further advantage that the tightness of the walls may be easily ascertained by means of a heavy gas tracing or detecting instrument. For purposes of filling the interspaces with the heavy gas, it is possible to simultaneously use the filling openings used for the insulating filler material, however, additional connections for filling with the heavy gas may also be provided.

A partial vacuum may also be produced in the interspaces. It is desirable for this purpose to have a pump, which may be vacuum-controlled if desired, to remain in a constant connection so that the vacuum will be continually maintained and the pump will re-pump, if necessary.

Since at least the outer shell and, if desired, also the inner shell must be completely resistant to the diffusion of vapors, the overlapping portions should either be glued over, after the insertion therebetween of the sealing strip, with a material in the form of strips, or sprayed with a plastic coating.

A further guarantee of the necessary vapor tightness, particularly of the outer shell at the overlapping portions thereof, may be achieved by soldering or welding the appropriate connections according to conventional methods.

Figure 5:
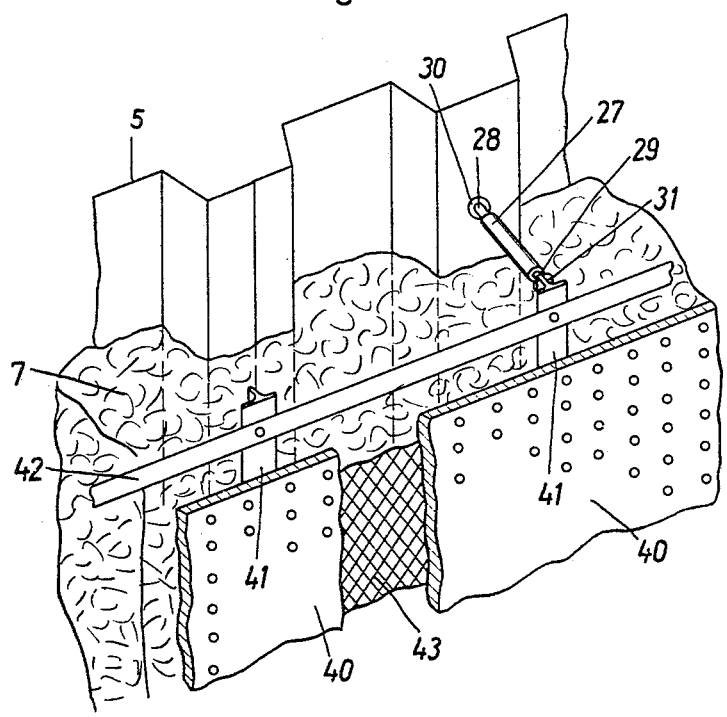
FIGURE 5 shows schematically in the form of a perspective view a partial cross-section through a wall according to a further embodiment of the present invention.

In the embodiment according to FIGURE 5, the walls and, analogously, the ceiling are again provided in a two-shelled manner. The outer lining or shell is formed therein by the profiled metal sheet 5, preferably provided as a trapezoidal profile. The inner shell 40 is formed by a non-combustible material in the form of a sheet or strips. FIGURE 5 schematically illustrates a cover plate in the form of a perforated sheet 40. A frame construction of T-shaped beams 41, which are preferably arranged vertically and consist of strip profiles or sections 42 provided horizontally to form T-shaped profiles with beams 41, serves for the attachment of the cover plates or sheets 40. To provide a spacing mounting support, spacer elements 27 are again employed. These consist of non-combustible or difficultly inflammable plastic elements, but may also be made from ceramic material. The connecting elements 27 are again provided and arranged in such a manner that relative movements between the outer shell 5 and the inner shell 40 are possible. The fastening screws 30 and 31 for the connecting elements 27 may each be individually secured either directly to the outer and inner shell, or they may be provided on additional supporting profiles. The connecting elements 27 are suitably arranged at the points of intersection of the supporting framework 41, 42. In the embodiment shown, the insulation consists of mineral wool 7 which is stuffed into the interspace. In order to allow for an easier filling operation for the insulating material prior to applying the cover plates or sheets 40, a wire net or grating 43 is disposed at the supporting framework 41, 42.

When preparing the insulating layer by foaming a synthetic resin foam material at the site of actual assembly, it is expedient to initially apply the cover plates 40 of one horizontal row and to foam in the insulation in this partial area of the wall. In order to absorb the pressure being produced during such a foaming operation, supporting elements or sheetings are provided which are displaced or reset, after the completion of the foaming operation, for the next horizontal insulating layer. These supporting elements or sheetings have not been shown in FIGURE. 5.

The construction of a cold storage plant of this type is possible in a rapid and simple manner after the supporting structure has been set up, since profiled steel sheets are readily available in large assembly lengths and the inner cover sheets are available already in a pre-folded or pre-grooved form. The operations of filling, pouring or blowing of the insulating material are quite easily carried out with the known construction equipment or construction machines.

The present invention has been described hereinbefore in connection with a cold storage building. The term cold storage building should, however, not be restricted to the narrow interpretation of a cooling chamber for temperatures to only about −15° C., but should equally encompass deep freeze or refrigeration plants which have a cooling chamber temperature to about −40° C. or below.

The present invention is not limited to the embodiments and details disclosed and described herein. However, it is essential and important to note the use of a double-shell design and of a non-combustible or difficultly inflammable insulating material, preferably insulating substances adapted to being poured or to flow.

The particular provision used in a given individual case depends upon any special respective requirements or conditions. The most suitable selection and combination with respect to the insulating materials and the inner shell material utilized is thus made accordingly.

The invention being thus described, it will be obvious that the same may be varied in many ways. Such variations are not to be regarded as a departure from the spirit and scope of the invention and all such modifications are intended to be included within the scope of the following claim.

We claim:
1. A cold storage building comprising self-supporting walls and ceiling having an inner and outer shell structure defining a cavity therebetween, said shell structures comprising composite profiled sheeting, insulating means disposed within said cavity and spacer means connecting said inner and outer shell structures in a grid-like manner, said spacer means composed of materials having low heat conductivity, wherein the spacer means are rotatably and pivotally mounted in each of the shell structures in order to provide for relative movement of the shells, and is provided at both ends with ball end screws which mate with ball sockets which are directly or indirectly attached to the shell structures.

References Cited

UNITED STATES PATENTS

| | | | |
|---|---|---|---|
| 2,318,747 | 5/1943 | Brown | 52—743 |
| 2,575,941 | 11/1951 | Brunnzell | 52—404 |
| 2,781,006 | 2/1957 | Heuer | 110—1 |
| 2,684,171 | 7/1954 | Ernst | 220—15 |
| 3,011,674 | 12/1961 | Jackson | 220—15 |
| 3,021,027 | 2/1962 | Clayton | 220—15 |
| 3,242,625 | 3/1966 | Tillinghart | 52—743 |
| 2,396,459 | 3/1946 | Dana | 220—15 |
| 2,563,118 | 8/1951 | Jackson | 52—80 X |
| 2,682,939 | 7/1954 | Bailey | 52—404 |
| 2,959,318 | 11/1960 | Clark | 220—15 |
| 3,058,551 | 10/1962 | Martin | 52—404 X |
| 3,094,071 | 6/1963 | Beckman | 220—15 X |

FOREIGN PATENTS 605,407    1960    Canada.

OTHER REFERENCES

Civil Engineering, August 1963, p. 118.

JOHN E. MURTAGH, Primary Examiner

U.S. Cl. X.R.

52—404, 483, 508, 618; 220—15